Aug. 7, 1934.  F. E. WOCEL  1,969,679

LIQUID GAUGE

Filed Aug. 15, 1930

INVENTOR
Frank E. Wocel
BY Joseph F. O'Brien
ATTORNEY

UNITED STATES PATENT OFFICE 1,969,679

LIQUID GAUGE

Frank E. Wocel, New York, N. Y.

Application August 15, 1930, Serial No. 475,429

7 Claims. (Cl. 73—82)

This invention relates to improvements in liquid gauges and particularly to gauges for fuel tanks of airplanes and other fast-moving vehicles.

My present invention constitutes an improvement upon the device shown and described in my co-pending application, Serial No. 363,726, filed May 17, 1929, in which the gauge tube is composed of a highly transparent phenolic condensation product preferably produced by molding a block or body of phenolic condensation product, preferably of stream-line conformation, removing the outer mold scale, boring the body to form a tubular housing and highly polishing the outer surface and the bore to produce a gauge tube or housing having a high degree of transparency.

One of the objects of my present invention is to improve the device of my said co-pending application by producing a liquid gauge construction of the type specified therein in which the gauge tube and indicating mechanism, including the float and guide mechanism therefor, will be capable of assembly into a single unit or device which may be shipped from the factory as a complete entity having the parts arranged in properly adjusted relationship so as to be capable of immediate and quick mounting in the fuel tank of an airplane or other fast moving vehicle without further assembly or adjustment.

Another object of my invention is to utilize the edge of the transparent gauge tube or housing on which to mount a float, guide rods therefor and an indicating element extending within the housing, and also to reinforce such edge to enable a secure mounting of said parts thereon.

Still another object of my invention is to utilize, in connection with my transparent gauge housing a screw-connecting element and a locknut so arranged or combined with the gauge tube that said gauge tube or housing may be securely connected and locked in properly adjusted position to the metallic fuel tank without applying pressure, stress or force on the gauge tube during the connection or locking of the device on the fuel tank.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawing, in which:—

Figure 1:
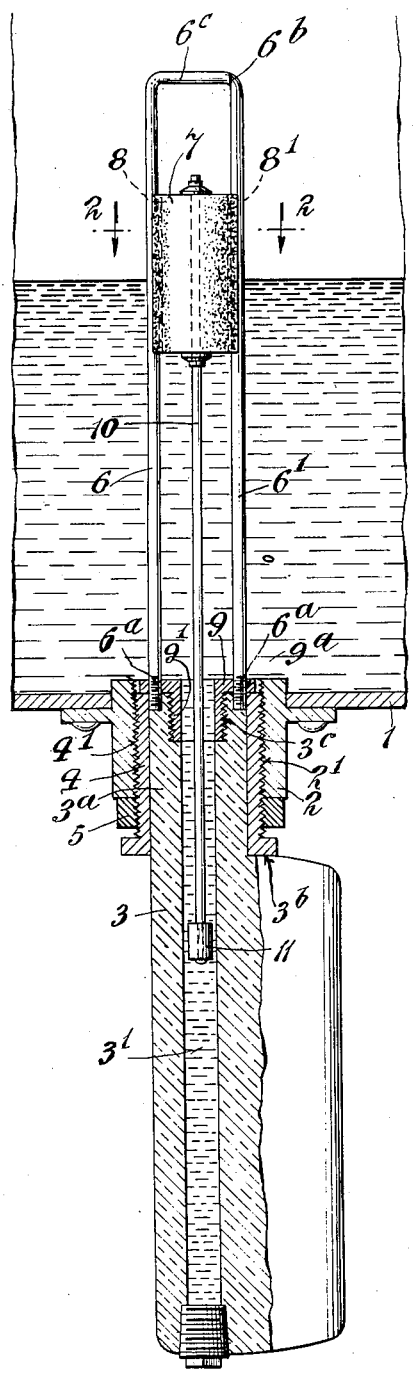
Fig. 1 is a vertical section, showing my improved gauge mounted beneath a fuel tank.
Figure 2:
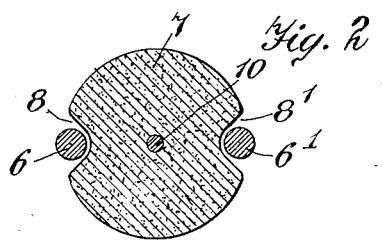
Fig. 2 is a section on the line 2—2 of Fig. 1, looking in the direction of the arrow.
Figure 3:
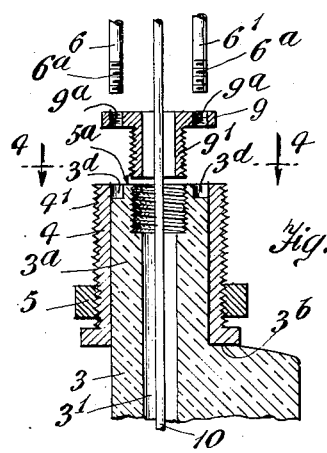
Fig. 3 is a fragmentary section of the boss-portion of the gauge tube or housing, showing in separated relationship the connection elements for mounting the unitary device on a fuel tank and for fastening the parts to each other.
Figure 4:
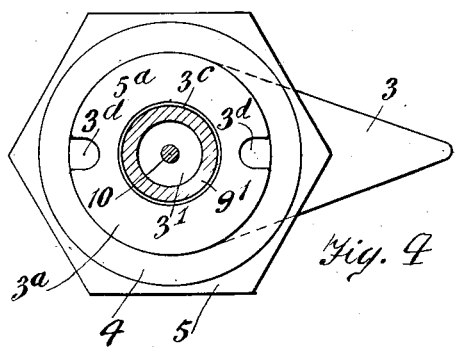
Fig. 4 is a section on the line 4—4 of Fig. 3.

Referring now to this drawing, which illustrates a preferred embodiment of my invention, 1 indicates a fuel tank, having the usual nipple 2 provided with an internally screw-threaded opening 2'.

In accordance with my invention, a gauge tube or housing 3 preferably composed of a transparent phenolic condensation product and having a longitudinal bore 3' is provided at its upper end with a cylindrical stub or boss $3^a$ of a diameter smaller than the tank-opening 2' and has mounted on its exterior surface a nipple or sleeve 4 having exterior screw threads 4' adapted to fit and mesh with the internal screw-threads of the tank-nipple 2. The nipple 4 is preferably securely fastened to the exterior surface of the cylindrical boss $3^a$ by making the metallic nipple of similar or slightly smaller internal diameter, expanding the same, applying it to the stub and allowing it to contract thereon, and I also preferably apply any suitable cement between all the contacting surfaces, including the contacting surfaces at $3^b$.

When mounted as above indicated and suitably fastened to the stub $3^a$ the metallic nipple 4 forms a connecting element by which the gauge tube or housing 3 may be mounted in the fuel tank without danger of breaking off the boss when excessive pressure is applied by a wrench in screwing the device home in the tank-nipple 2.

In the preferred form of my invention, I also provide on the threaded nipple a lock nut 5 so as to permit the device to be securely locked to the tank-nipple and this locking may also be accomplished without danger of breaking the gauge or housing 3 or its boss $3^a$. The upper edge $5^a$ of the gauge or housing 3 is used for the mounting of guide rods 6, 6' on which guide rods is slidably mounted a float 7 which, as shown, is provided with side notches 8, 8' within which the guide rods fit so as to provide a bearing and these guide rods 6, 6' are fastened together at their upper ends by a cross-strut $6^c$ which, as illustrated, is integral with the guide rod 6 and is fastened or soldered at $6^b$ to the guide rod 6'.

It will be apparent that this strut 6ᶜ will connect and retain the guide-rods in position at the upper ends thereof so as to keep the same in parallel relationship at said upper end. The lower ends of the guide rods 6, 6' are fastened in similar relationship to the top edge of the boss 3 which is preferably reinforced by a metallic washer 9 connected to said edge preferably by soldering the same to the nipple 4 and also by combining the washer with an externally screw-threaded sleeve or nipple 9' formed integrally therewith and engaging with internal screw threads on a socket formed concentrically with the bore 3'. In the preferred form of my invention, the rods 6, 6' are screw-threaded at their lower ends as at 6ᵃ, engage with screw-threaded bores 9ᵃ in the washer 9 and extend into notches 3ᵈ in the boss 3ᵃ of the gauge, thus locking the screw-threaded nipple 9' and washer 9 to the boss 3ᵃ.

The guide rods 6, 6' thus provide a slide-way for the float 7 and also cause a locking of the washer and nipple within the screw-threaded socket 3ᶜ.

Mounted axially within the float 7 is an indicator rod 10. As illustrated, the upper end of said indicating rod extends axially through the float 7 and may be fastened to the float in any suitable manner. Said indicator rod 10 has at its opposite end an indicating element or block 11 which is preferably of a solid contrasting color, such as red or black, so as to enable ready sighting thereof through the gauge housing.

The method of producing my transparent gauge housing of a phenolic condensation product is fully explained in my co-pending application and forms no part of this invention, except that, by the use of a gauge housing, I am enabled to utilize a stub or boss as a mounting element for the gauge float and indicating means so that the float and indicating element may be assembled with the gauge housing and properly adjusted at the factory, thus providing a complete unitary structure which may be applied to the fuel tank of an airplane or other fast-moving vehicle by an exceedingly simple operation and by persons lacking in mechanical skill.

It will also be understood that the unitary structures so assembled at the factory may be shipped in completely assembled condition so as to avoid the necessity of all further assembly by the user.

The metallic nipple 4 reinforces the boss and permits locking by the lock-nut 5 and enables the screw-connection of the device to be made with the tank without danger of injuring or splitting the stub or boss 3ᵃ during the operation of applying the gauge to a fuel tank of an airplane. In mounting my gauge within the fuel tank, the guide rods and float, completely assembled, as aforesaid, are passed through the screw-threaded aperture or hole 2 and the reinforced and screw-threaded stub or boss is screwed home into said screw-threaded hole 2 until it is substantially tight and the stream-line gauge glass is in proper position relatively to the longitudinal axis of the ship, whereupon the lock-nut 5 is turned by a wrench for the purpose of producing a thorough locking of the gauge in proper position.

The operation of the gauge will be obvious from the above description and from an examination of the drawing and need not be here described.

Having described my invention, I claim:—

1. A liquid gauge embodying a transparent gauge tube having integrally formed therewith a boss at its upper end, a metallic reinforcing connecting element secured on said boss and adapted to enter and be secured in an opening formed in a tank, said boss being provided at its upper edge with means for guiding a float, and an indicating element depending from said float into said tube, whereby a unitary, completely assembled structure for insertion into a fuel tank will be provided.

2. A liquid gauge embodying a transparent gauge tube formed of non-vitreous material provided with an axial bore and having at its upper end a boss adapted to enter and be secured in an opening formed in a tank, said boss being formed integrally with said transparent tube and having securely fastened thereon a metallic reinforcing nipple provided with external screw-threads for connection to said tank, and an indicating element depending from said float into said tube.

3. A liquid gauge embodying a transparent gauge tube formed of non-vitreous material provided with an axial bore and having at its upper end a boss adapted to enter and be secured in an opening formed in a tank, said boss being formed integrally with said transparent tube and having securely fastened thereon a metallic connecting element having external screw-threads for connection to said tank, and also provided at its upper edge with means for mounting a float and an indicating element depending from said float into said tube, whereby a unitary, completely assembled structure for insertion into a fuel tank will be provided.

4. A liquid gauge embodying a gauge tube formed of transparent material, provided with an axial bore and having integrally-formed at its upper end a boss provided with a metallic connecting element having external screw-threads for connection to a tank, and also provided at its upper edge with means for mounting a float and an indicating element, said float-mounting means comprising guide-rods between which said float is mounted and having their ends mounted on said boss, and means for reinforcing the upper edge of said boss comprising a washer having bores therein through which said rods extend.

5. A liquid gauge embodying a gauge tube formed of transparent material, provided with an axial bore and having integrally formed at its upper end a boss provided with a metallic connecting element having external screw-threads for connection to a tank, and also provided at its upper edge with means for mounting a float and an indicating element, said float-mounting means comprising guide-rods between which said float is mounted and having their ends mounted on said boss, means for reinforcing the upper edge of said boss comprising a washer provided with bores therein through which said rods extend, said washer having screw-threaded means for fastening the same to said upper edge.

6. A liquid gauge embodying a gauge tube formed of transparent material, provided with an axial bore and having integrally formed at its upper end a boss provided with a metallic connecting element having external screw-threads for connection to a tank, a lock-nut mounted on said metallic connecting element and also provided at its upper edge with means for mounting a float and an indicating element, said float-mounting means comprising guide-rods between which said float is mounted and having their ends mounted on said boss, means for reinforcing the upper edge of said boss comprising a washer having flange bores through which said rods extend, said washer having screw-threaded means for fastening the same to said upper end, and said rods being arranged to extend through said washer bores and into engagement with the boss to lock the screw-engaged washer to said boss.

7. A liquid gauge embodying a housing formed of transparent non-vitreous material provided with an axial bore and having at its upper end a boss provided with a metallic connecting element having external screw-threads for connection to a tank, a lock-nut mounted on said metallic connecting element and also provided at its upper edge with means for mounting a float and an indicating element, said float-mounting means comprising guide-rods between which said float is mounted and having their ends mounted on said boss, and means for reinforcing the upper edge of said boss comprising a washer through which said rods extend.

FRANK E. WOCEL.